(No Model.)
J. MEYER.
TREE FOR SHOE UPPERS.
No. 317,560. Patented May 12, 1885.
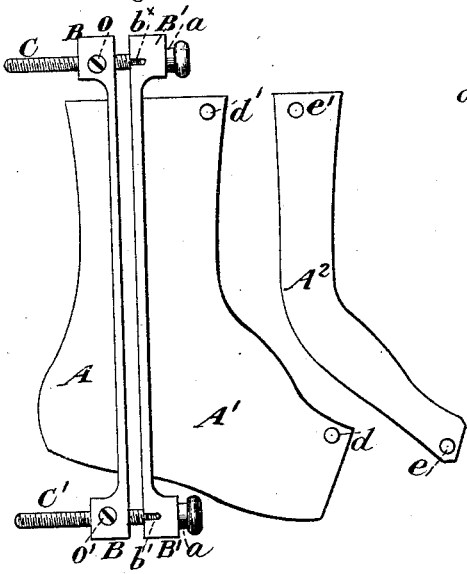
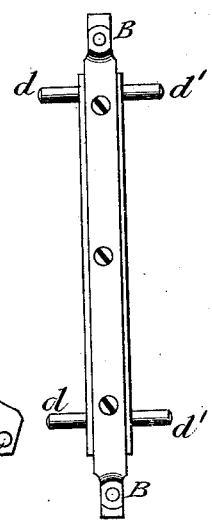
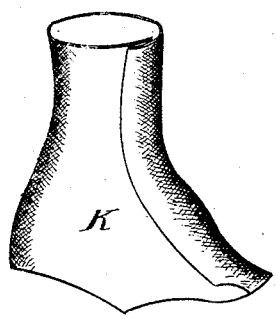
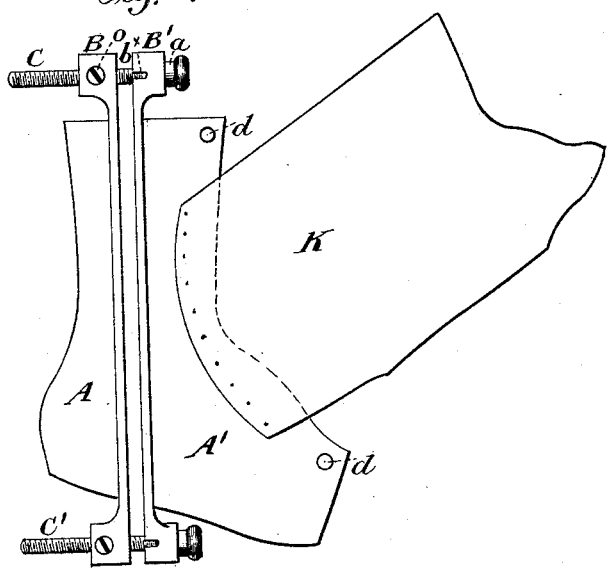
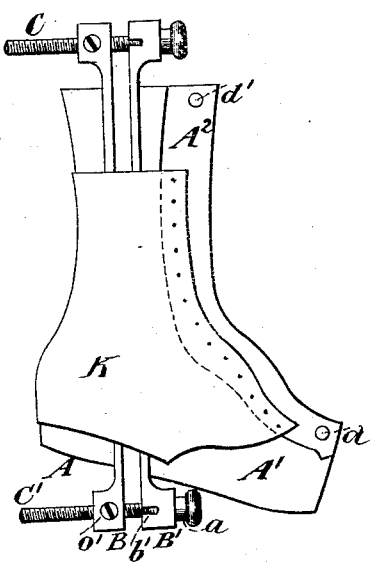
Witnesses.
A. Ruppert.
Alfred T. Gage.
Inventor:
John Meyer,
Per
Thomas P. Simpson
Attorney

UNITED STATES PATENT OFFICE.

JOHN MEYER, OF PITTSBURG, PENNSYLVANIA.

TREE FOR SHOE-UPPERS.

SPECIFICATION forming part of Letters Patent No. 317,560, dated May 12, 1885.

Application filed January 30, 1885. (No model.)

*To all whom it may concern:*

Be it known that I, JOHN MEYER, a citizen of Germany, residing at Pittsburg, in the county of Allegheny and State of Pennsylvania, have invented an Improved Upper-Tree for Shoes; and I hereby declare the following to be a full, clear, and exact description thereof, reference being had to the accompanying drawings, forming a part thereof.

The object of the invention is to make an adjustable two-part tree for the uppers of shoes, so that it may be used as hereinafter described.

Figure 1 in the drawings is a side view of my shoe-upper tree, with the follower $A^2$ detached. Fig. 2 is an edge view of a section of same. Fig. 3 is a side view of the tree with the leather attached. Fig. 4 is a view of same with the follower $A^2$ in place and the other edge of the leather fastened to the follower ready for stretching. Fig. 5 is the seamless upper as a new article of manufacture.

In the manufacture of the seamless-shoe uppers I use an upper-tree which I will now describe. In the drawings, Fig. 1, A, A', and $A^2$ represent my shoe-upper tree with the follower $A^2$ detached ready for use. Those parts of the tree marked A, A', and $A^2$ are made of wood. At the point where A and A' come together they are provided with metal clamps B and B'. The clamp B is screwed fast to A, and B' is fastened to A'. At the top and bottom these clamps are joined together by means of the screws C and C'. The ends of clamp B' are bored and sufficiently large to allow the screw to pass through up to the collar without engaging the thread. When the screws C C' are placed thus, a pin is passed through each at $b\ b'$, by means of which the screws are allowed to revolve, but are held tight against the collars $a\ a'$. At the top and bottom of B B the clamps are provided with pivoted nuts $o\ o'$, through which the screws C C' operate. The front part of the tree A' is provided with two projecting pins, $d\ d'$. These pins project on both sides. The follower $A^2$ has holes bored in it at $e\ e'$, so that the follower may pass over the pins $d\ d'$. The metal clamps are screwed fast to the wood, as shown in Fig. 2.

When the upper-tree has been thus constructed and the screws properly adjusted, a piece of upper-leather, K, of the proper shape, is attached to the tree at one end by the use of tacks, as shown in Fig. 3. The leather is then drawn around the tree, the follower $A^2$ is placed over the pins $d\ d'$, and the leather drawn tightly over the follower and tacked down. The screws may then be turned so as to spread the tree and force the upper into proper size and shape; or the screws may be adjusted to the proper position, and the leather drawn around and stretched into shape by the use of pinchers, as done where the upper is made of two pieces.

By the use of the screws $d\ d'$ the tree may be adjusted to make all sizes and shapes of seamless uppers, as the general sizes are made less by drawing the sections A A' together alike at each end, while they may be enlarged by forcing them from each other alike at both ends; and by contracting one end and expanding the other a large heel and a small top can be made, while by reversing the movement a small heel and a wide top can be made. Thus all sizes and shapes may be made on the one tree.

It will be noticed that the pins $d\ d$ project from both sides of A'. This is done in order that the follower $A^2$ may be put on either side of A', so that a right or left shoe-upper may be made.

What I claim, and desire to secure by Letters Patent, is—

The two-part tree A A', combined with a follower, $A^2$, having holes $e\ e'$, clamps B B' C C', collars $a\ a'$, pins $b\ b'$, pivoted nuts $o\ o'$, and pins $d\ d'$, whereby the said tree may be used as described.

JOHN MEYER.

Witnesses:
 FRANK M. REESE,
 H. L. REESE.